June 19, 1923. Re. 15,630

J. H. IREY

WALL STRUCTURE FOR CORNCRIBS AND THE LIKE

Original Filed Oct. 6, 1919

INVENTOR
John H. Irey
ATTORNEY
Jeffs & Jeffs

Reissued June 19, 1923. Re. 15,630

UNITED STATES PATENT OFFICE.

JOHN H. IREY, OF MUSCATINE, IOWA, ASSIGNOR TO PORTABLE ELEVATOR MFG. CO., OF BLOOMINGTON, ILLINOIS.

WALL STRUCTURE FOR CORNCRIBS AND THE LIKE.

Original No. 1,382,362, dated June 21, 1921, Serial No. 328,740, filed October 6, 1919. Application for reissue filed February 1, 1922. Serial No. 533,421.

*To all whom it may concern:*

Be it known that I, JOHN H. IREY, a citizen of the United States, residing at Muscatine, in the county of Muscatine and State of Iowa, have invented certain new and useful Improvements in Wall Structures for Corncribs and the like, of which the following is a specification.

The invention has for an object to enable the construction of ventilated walls such as are required for corn cribs by the use of stock material such as is employed in the construction of grain cribs, and other wall constructions. It is a particular object to enable the construction of a corn crib with suitably ventilated walls, while at the same time there will be a minimum liability of ingress of water during storms.

A further object is to provide an improvement in a specific article of manufacture adapted to enable the construction of ventilated walls from ordinary blocks, bricks and the like without requiring the cutting of the wall nor the building of special openings therein requiring a disturbance of the orderly formation of courses as ordinarily followed in the construction of a solid wall.

Additional objects, advantages and features of invention will appear from the construction, arrangement and combination of parts hereinafter set forth comprising one of the possible embodiments of my invention, an approximate representation thereof being made in the accompanying drawings, wherein—

Figure 1:
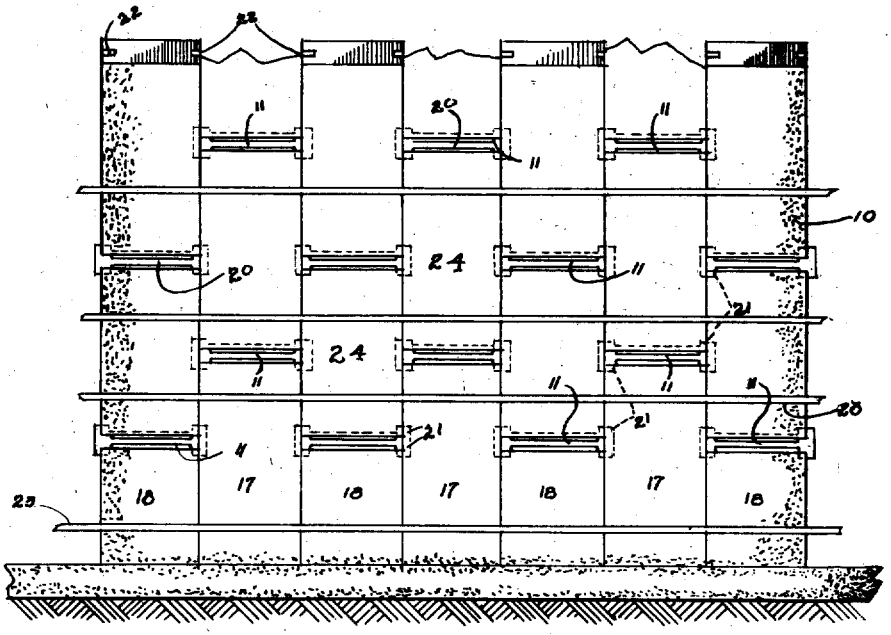
Figure 1 is a fragmentary elevational view of a section of a concrete corn crib wall embodying my invention.
Figure 2:
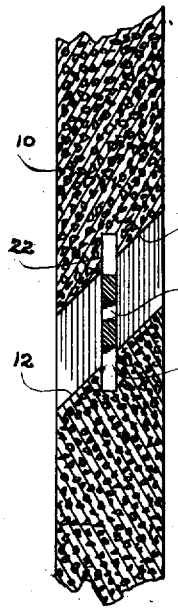
Fig. 2 is a fragmentary vertical cross section thereof.
Figure 3:
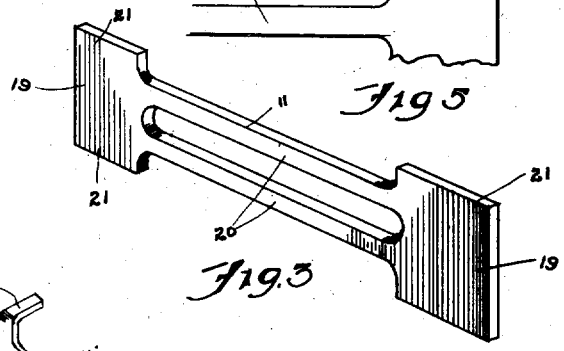
Figure 3 is a detail of the ventilating spacer unit interposed between the superposed blocks of the wall.

There is illustrated a section of wall 10 which may be used as a corn crib wall or as a bin wall for other uses. In order to effect the formation of ventilating openings in the wall without changing the orderly form of the courses of blocks or other building units employed, I have provided a spacer plate and guard 11, illustrated in Fig. 3 which may be set in place upon the upper surface of certain of the building units and other units superposed thereon, by which the latter are held spaced above the lower ones, the plate 11 thus becoming or taking the place of building units or parts thereof. Preferably in the construction of grain cribs, I use blocks termed "stave elements" which for the most part are formed with outwardly inclined upper and lower edges 12 and 13, in Fig. 2. The bottom and top blocks, however, are formed with horizontal edge faces at one end and sloping faces at the other. The blocks having such formation may be termed starting and finishing blocks, and are formed in two sizes, one being longer than the other, as indicated at 17 and 18 in Fig. 1 so that when blocks of uniform size are superposed thereon in vertical series or courses they will break joints uniformly as shown in this view. In its preferred form, my spacer device is constructed as shown in Fig. 3, being a stamping of thick sheet metal or a casting, comprising head portions 19 at each end connected by a plurality of narrow bars 20 in sufficient number and spaced close enough together to prevent passage therebetween of small rodents and vermin such as mice. The head portions 19 are provided with projecting ears 21, at top and bottom adapted to be set in notches which may be formed or cut in the opposed faces of superposed stave elements as shown in Fig. 2.

In the use of this invention, the stave elements are cast in the form indicated, and if not provided with the notches 22 adapted to receive the ears 21 at each side, they may be notched with a chisel or other suitable tool as they are put in place. The first course of stave elements 17 and 18 alternately are put in place and secured by a hoop element 23 before any other elements are superposed thereon, when constructing a grain crib after the method illustrated in Fig. 2. Intermediate stave elements 24 are superposed upon the elements 18, with my spacer plates 11 interposed as shown in Fig. 2, and a second hoop element 23 is then engaged around the upper ends of the elements 14 and the lower parts of the elements 24.

Figure 6:
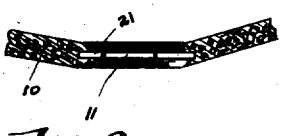
Fig. 6 is a fragmentary horizontal section of wall showing the angular relation between the stave units, and the relation between the masonry units and my spacer.

Customarily, the stave elements used in constructing circular cribs, and bins have their vertical edge portions concave at one side and convex at the other, as shown in Fig. 6, so that they interlock to a certain extent, thus facilitating the use of my spacing plate and preventing liability of lateral displacement of the upper stave elements when supported upon my plates 11. After the engagement of hoops around the staves, however, the interlocking vertical edge portions are not depended upon to prevent such displacement, as will be understood, and also the weight of the upper elements is largely taken up or carried by the cement between laterally adjacent stave elements.

Figure 4:
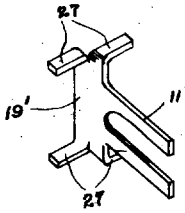
Fig. 4 is a fragmentary perspective of a modification of the spacer element.

If desired, the spacer device may be formed as shown in Fig. 4 wherein a plate 11' is provided similar to the one first described with the exception that the head portions 10' are provided at their upper and lower parts with oppositely extended flanges 27 by which the device will be self-supporting upon a horizontal surface.

It has been found that with this construction a crib can be built very quickly, less time having been required to construct a crib of a given capacity than by the use of any other known building material, with workmen operating at ordinary speed.

With building blocks of ordinary thickness, the sloping of the vertically adjacent faces of the stave elements at an angle of about 45 degrees to the horizontal locates the inner upper edge portion of the lower stave unit well above the outer lower edge of the upper stave element, (see Fig. 2) making it impossible for ordinary rain to beat in upon the contents of the crib.

Figure 5:
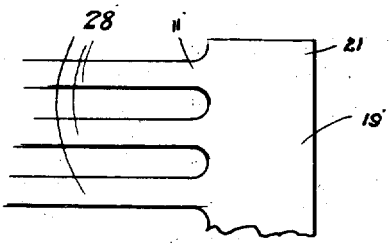
Fig. 5 is a fragmentary end view of a spacer with more than two bars.

In Fig. 5 there is illustrated the possibility of forming the spacers with a greater number of connecting bars, 28, corresponding to those 20, before mentioned.

What I claim is:

1. A course building element for a directly ventilated wall comprising head portions and connecting air admitting vermin guard parts therebetween, said head portions having parts projected above and below said connecting portions.

2. A masonry course unit comprising head parts and connecting air admitting vermin guard parts, said head having broad upper and lower parts to afford a wide bearing on supporting and superposed masonry.

3. A course building element for a ventilated corn crib wall comprising a plurality of air admitting vermin guard parts and head portions therefor adapted to engage the adjacent wall sections.

In testimony whereof, I have affixed my signature.

JOHN H. IREY.